United States Patent
Matsubara et al.

(10) Patent No.: US 8,557,459 B2
(45) Date of Patent: Oct. 15, 2013

(54) FUEL CELL SYSTEM, METHOD OF STOPPING OPERATION OF THE FUEL CELL SYSTEM, AND METHOD OF STARTING OPERATION OF THE FUEL CELL SYSTEM

(75) Inventors: Takeshi Matsubara, Utsunomiya (JP); Takao Fukumizu, Utsunomiya (JP); Masahiro Mohri, Utsunomiya (JP); Ryugo Suzuki, Kasama (JP); Hiromichi Yoshida, Shioya-gun (JP); Fusao Nakagawa, Sakura (JP)

(73) Assignee: Honda Motor Co., Ltd., Tokyo (JP)

( * ) Notice: Subject to any disclaimer, the term of this patent is extended or adjusted under 35 U.S.C. 154(b) by 1207 days.

(21) Appl. No.: 12/343,078

(22) Filed: Dec. 23, 2008

(65) Prior Publication Data
US 2009/0169929 A1    Jul. 2, 2009

(30) Foreign Application Priority Data
Dec. 28, 2007    (JP) .................. 2007-339890

(51) Int. Cl.
*H01M 8/04* (2006.01)
(52) U.S. Cl.
USPC ............ 429/429; 429/413; 429/444; 429/513
(58) Field of Classification Search
USPC .................. 429/413, 444, 429, 513
See application file for complete search history.

(56) References Cited

U.S. PATENT DOCUMENTS

| | | |
|---|---|---|
| 6,558,824 B1 | 5/2003 | Muchnic et al. |
| 7,141,324 B2 | 11/2006 | Margiott et al. |
| 2008/0044691 A1 | 2/2008 | Wake et al. |

FOREIGN PATENT DOCUMENTS

| | | |
|---|---|---|
| JP | 2003-331893 | 11/2003 |
| JP | 2005-332647 | 12/2005 |
| JP | 2006-48933 | 2/2006 |
| JP | 2006-507647 | 3/2006 |
| JP | 2007-59321 | 3/2007 |
| JP | 2007-193983 | 8/2007 |
| JP | 2007-250218 | 9/2007 |
| WO | WO-2004/049468 A2 | 6/2004 |

OTHER PUBLICATIONS

JP,2005-332647 machine translation.*
JP 2006-048933 machine translation.*
Japanese Office Action for Application No. 2007-339890, dated Jan. 18, 2011.
Japanese Office Action for Application No. 2007-339890, dated May 25, 2010.

* cited by examiner

*Primary Examiner* — Patrick Ryan
*Assistant Examiner* — Alex Usyatinsky
(74) *Attorney, Agent, or Firm* — Nelson Mullins Riley & Scarborough LLP; Anthony A. Laurentano

(57) ABSTRACT

A fuel cell system includes a fuel cell stack, an oxygen-containing gas supply apparatus, a fuel gas supply apparatus, a pressure reduction apparatus, and a dilution apparatus. The oxygen-containing gas supply apparatus supplies an oxygen-containing gas to the fuel cell stack. The oxygen-containing gas supply apparatus is capable of supplying the air to the fuel gas flow field at the time of stopping operation of the fuel cell system. The fuel gas supply apparatus supplies a fuel gas to the fuel cell stack. The pressure reduction apparatus suctions gases in the oxygen-containing gas flow field and the fuel gas flow field. The dilution apparatus dilutes the fuel gas suctioned by the pressure reduction apparatus using the air.

1 Claim, 18 Drawing Sheets

FIG. 6 [POWER GENERATION]

FIG. 13 [PRESSURE REDUCTION]

FIG. 15 [POWER GENERATION]

[PRESSURE REDUCTION]

[SUPPLY OF AIR]

FUEL CELL SYSTEM, METHOD OF STOPPING OPERATION OF THE FUEL CELL SYSTEM, AND METHOD OF STARTING OPERATION OF THE FUEL CELL SYSTEM

BACKGROUND OF THE INVENTION

1. Field of the Invention

The present invention relates a fuel cell system including a fuel cell having an oxygen-containing gas flow field for supplying an oxygen-containing gas to a cathode and a fuel gas flow field for supplying a fuel gas to an anode to generate electricity by electrochemical reactions of the oxygen-containing gas and the fuel gas. Further, the present invention relates to a method of stopping operation of the fuel cell system, and starting operation of the fuel cell system.

2. Description of the Related Art

Fuel cells are systems for obtaining direct current electrical energy by supplying a fuel gas (chiefly containing hydrogen) and an oxygen-containing gas (chiefly containing oxygen) to an anode and a cathode for inducing electrochemical reactions at the anode and the cathode.

For example, a solid polymer electrolyte fuel cell employs a membrane electrode assembly (MEA) which includes a pair of electrodes (anode and cathode), and an electrolyte membrane interposed between the electrodes. The electrolyte membrane is a polymer ion exchange membrane. The membrane electrode assembly is interposed between a pair of separators. The membrane electrode assembly and the separators make up a unit of power generation cell for generating electricity. Generally, in the power generation cell of this type, predetermined numbers of membrane electrode assemblies and separators are stacked alternately to form a fuel cell stack.

In the fuel cell of this type, when power generation (operation) is stopped, though supply of the fuel gas and the oxygen-containing gas to the fuel cell is stopped, some fuel gas remains at the anode, and some oxygen-containing gas remains at the cathode. Therefore, during the stop of operation of the fuel cell, the cathode is kept to have a high potential, and degradation of the electrode catalyst layer occurs.

In this regard, for example, an approach for forcibly purging the fuel gas remaining at the anode using an inert gas such as the air, nitrogen, or the like is adopted. Therefore, when operation of the fuel cell stack is stopped, for example, the air is present at the cathode and the anode.

Further, even if the above purge process is not carried out, in the case where operation of the fuel cell stack has been stopped for a long period of time, the air passes through the electrolyte membrane from the cathode toward the anode. Therefore, the air is present at both of the cathode and the anode.

In this state, if operation of the fuel cell is started, at the time of starting supply of the fuel gas to the anode, since hydrogen and the air are mixedly present, the cathode tends to have a high voltage. Thus, the power generation performance may be degraded undesirably due to degradation in the performance of the electrode catalyst layer of the cathode (Japanese Laid-Open Patent Publication No. 2006-507647 (PCT)).

In an attempt to address the problem, for example, in a method of stopping a fuel cell power plant disclosed in U.S. Pat. No. 7,141,324, a load is disconnected from a fuel cell, and supply of an oxygen-containing gas to an oxygen-containing gas flow field is stopped, and then, a fuel gas is supplied to the oxygen-containing gas flow field for filling the oxygen-containing gas flow field and the fuel gas flow field with the fuel gas.

However, in the above conventional technique, at the time of stopping operation of the fuel cell, it takes relatively long time to replace the oxygen-containing gas remaining in the oxygen-containing gas flow field with the fuel gas. Therefore, it takes considerable time to completely stop operation of the fuel cell, and the process of stopping operation of the fuel cell cannot be performed efficiently.

SUMMARY OF THE INVENTION

The present invention has been made to solve the problem of this type, and an object of the present invention is to provide a fuel cell system, a method of stopping operation of the fuel cell system, and a method of starting operation of the fuel cell system in which it is possible to perform reliable replacement of a fuel gas and an oxygen-containing gas in a fuel gas flow field in a short period of time, and operation of the fuel cell system can be stopped, and started efficiently.

The present invention relates to a fuel cell system including a fuel cell having an oxygen-containing gas flow field for supplying an oxygen-containing gas to a cathode and a fuel gas flow field for supplying a fuel gas to an anode to generate electricity by electrochemical reactions of the oxygen-containing gas and the fuel gas.

The fuel cell system includes an oxygen-containing gas supply apparatus for supplying the oxygen-containing gas to the oxygen-containing gas flow field, and the oxygen-containing gas supply apparatus is capable of supplying the oxygen-containing gas to the fuel gas flow field at the time of stopping operation of the fuel cell system. Further, the fuel cell system includes a pressure reduction apparatus for suctioning a gas at least from the fuel gas flow field, and a dilution apparatus for diluting the fuel gas suctioned by the pressure reduction apparatus using the air.

Further, the present invention relates to a method of stopping operation of a fuel cell system including a fuel cell having an oxygen-containing gas flow field for supplying an oxygen-containing gas to a cathode and a fuel gas flow field for supplying a fuel gas to an anode to generate electricity by electrochemical reactions of the oxygen-containing gas and the fuel gas.

The method of stopping operation of the fuel cell system includes the steps of stopping supply of electricity from the fuel cell to the outside, stopping supply of the oxygen-containing gas to the oxygen-containing gas flow field and stopping supply of the fuel gas to the fuel gas flow field, suctioning a gas at least from the fuel gas flow field to reduce the pressure in the fuel gas flow field; and supplying the oxygen-containing gas at least to the fuel gas flow field for filling the fuel gas flow field and the oxygen-containing gas flow field with the oxygen-containing gas.

Further, the present invention relates to a method of starting operation of a fuel cell system including a fuel cell having an oxygen-containing gas flow field for supplying an oxygen-containing gas to a cathode and a fuel gas flow field for supplying a fuel gas to an anode to generate electricity by electrochemical reactions of the oxygen-containing gas and the fuel gas, and operation of the fuel cell system is stopped in a state where the oxygen-containing gas flow field and the fuel gas flow field are filled with the oxygen-containing gas.

The method of starting operation of the fuel cell system includes the steps of suctioning the oxygen-containing gas remaining at least in the fuel gas flow field to reduce the pressure in the fuel gas flow field, and supplying the fuel gas to the fuel gas flow field and supplying the oxygen-containing gas to the oxygen-containing gas flow field to generate electricity by the fuel cell.

In the present invention, the gas in the fuel gas flow field is suctioned by the pressure reduction apparatus to cause pressure reduction in the fuel gas flow field. Therefore, the gas in the fuel gas flow field is replaced with the desired gas rapidly and reliably. In the case where the fuel gas remains in the fuel gas flow field, the fuel gas suctioned by the pressure reduction apparatus is diluted with the air by the dilution apparatus. Therefore, the fuel gas having a high concentration is prevented from being directly discharged to the outside, and the fuel gas that has been sufficiently diluted is discharged. Thus, the exhaust gas treatment is performed suitably.

Further, in the present invention, at least the gas in the fuel gas flow field is suctioned to cause pressure reduction in the fuel gas flow field, and then, the oxygen-containing gas is supplied into the fuel gas flow field. Therefore, the fuel gas flow field and the oxygen-containing gas flow field are filled with the oxygen-containing gas in a short period of time. Accordingly, operation of the fuel cell is stopped rapidly and reliably. Additionally, the cathode does not have a high potential, and the decrease in the power generation performance due to the decrease in the performance of the electrode catalyst layer is prevented advantageously.

Further, in the present invention, at least the oxygen-containing gas remaining in the fuel gas flow field is suctioned to cause pressure reduction in the fuel gas flow field. Therefore, the fuel gas is supplied to the fuel gas flow field rapidly and reliably. Thus, the cathode does not have a high potential, and operation of the fuel cell is started efficiently.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
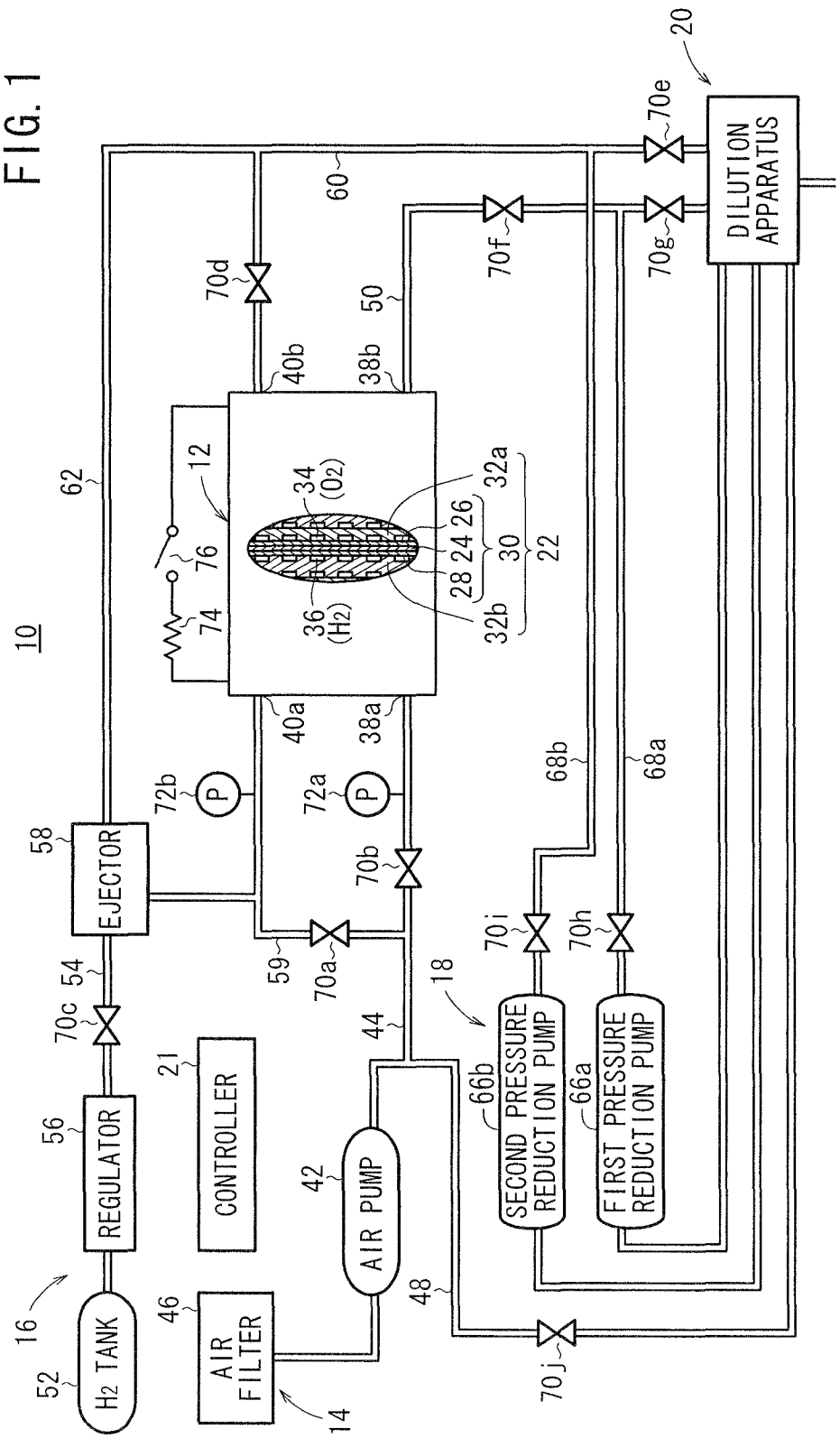
FIG. 1 is a diagram schematically showing structure of a fuel cell system according to a first embodiment of the present invention.

FIG. 1 is a diagram schematically showing structure of a fuel cell system 10 according to a first embodiment of the present invention.

The fuel cell system 10 includes a fuel cell stack 12, an oxygen-containing gas supply apparatus 14 for supplying an oxygen-containing gas to the fuel cell stack 12, a fuel gas supply apparatus 16 for supplying a fuel gas to the fuel cell stack 12, a pressure reduction apparatus 18 for suctioning gases from an oxygen-containing gas flow field 34 and a fuel gas flow field 36 as described later, a dilution apparatus 20 for diluting the fuel gas with the air, and a controller 21 for implementing the control of the entire fuel cell system 10.

The fuel cell stack 12 is formed by stacking a plurality of fuel cells 22. Each of the fuel cells 22 includes a membrane electrode assembly 30 and a pair of separators 32a, 32b sandwiching the membrane electrode assembly 30. The membrane electrode assembly 30 includes a cathode 26, an anode 28, and a solid polymer electrolyte membrane 24 interposed between the cathode 26 and the anode 28. The oxygen-containing gas flow field 34 is formed between the membrane electrode assembly 30 and the separator 32a for supplying the oxygen-containing gas to the cathode 26, and the fuel gas flow field 36 is formed between the membrane electrode assembly 30 and the separator 32b for supplying the fuel gas to the anode 28.

At one end of the fuel cell stack 12 in the stacking direction, an oxygen-containing gas supply passage 38a for supplying an oxygen-containing gas such as the air to the oxygen-containing gas flow field 34 and a fuel gas supply passage 40a for supplying a fuel gas such as a hydrogen-containing gas to the fuel gas flow field 36 are provided. At the other end of the fuel cell stack 12 in the stacking direction, an oxygen-containing gas discharge passage 38b for discharging the oxygen-containing gas from the oxygen-containing gas flow field 34 and a fuel gas discharge passage 40b for discharging the fuel gas from the fuel gas flow field 36 are provided.

The oxygen-containing gas supply apparatus 14 includes an air pump 42 for compressing the atmospheric air from the outside, and the air pump 42 is provided in an air supply channel 44. In the air supply channel 44, an air filter 46 is provided upstream of the air pump 42. The air supply channel 44 is connected to the oxygen-containing gas supply passage 38a of the fuel cell stack 12. A dilution channel 48 is branched from the air supply channel 44 at a position downstream of the air pump 42, and the dilution channel 48 is connected to the dilution apparatus 20. Though not shown, a humidifier is provided in the middle of the air supply channel 44.

The oxygen-containing gas supply apparatus 14 includes an air discharge channel 50 connected to the oxygen-containing gas discharge passage 38b. The air discharge channel 50 is connected to the dilution apparatus 20.

The fuel gas supply apparatus 16 includes a hydrogen tank 52 for storing a high-pressure hydrogen (hydrogen-containing gas). The hydrogen tank 52 is connected to the fuel gas supply passage 40a of the fuel cell stack 12 through a hydrogen supply channel 54. A regulator 56 and an ejector 58 are provided in the hydrogen supply channel 54. The air supply channel 44 and the downstream side of the ejector 58 are connectable through a branch channel 59.

The fuel gas discharge passage 40b is connected to an off gas channel 60, and a hydrogen circulation channel 62 is connected to the off gas channel 60. The off gas channel 60 is connected to the dilution apparatus 20, and the hydrogen circulation channel 62 is connected to the ejector 58.

The ejector 58 supplies the hydrogen gas supplied from the hydrogen tank 52 through the hydrogen supply channel 54 to the fuel cell stack 12. Further, the ejector 58 suctions the exhaust gas containing the unconsumed hydrogen gas which has not been consumed in the fuel cell stack 12, from the hydrogen circulation channel 62, and the exhaust gas is supplied again to the fuel cell stack 12, as the fuel gas.

The pressure reduction apparatus 18 includes a first pressure reduction pump 66a for suctioning a gas from the oxygen-containing gas flow field 34 and a second pressure reduction pump 66b for suctioning a gas from the fuel gas flow field 36 separately. The first pressure reduction pump 66a is provided in a first pressure reduction channel 68a, and the first pressure reduction channel 68a is connected to the air discharge channel 50 and the dilution apparatus 20. The second pressure reduction pump 66b is provided in a second pressure reduction channel 68b, and the second pressure reduction channel 68b is connected to the off gas channel 60 and the dilution apparatus 20.

First to tenth open/close valves 70a to 70j are provided in the fuel cell system 10. Specifically, the first open/close valve 70a is provided in the branch channel 59, the second open/close valve 70b is provided in the air supply channel 44, at a position downstream of the branch channel 59. The third open/close valve 70c is provided in the hydrogen supply channel 54, at a position between the regulator 56 and the ejector 58.

The fourth open/close valve 70d is provided in the off gas channel 60, at a position near the fuel gas discharge passage 40b. The fifth open/close valve 70e is provided in the off gas channel 60, at a position near the dilution apparatus 20. The sixth open/close valve 70f is provided in the air discharge channel 50, at a position near the oxygen-containing gas discharge passage 38b. The seventh open/close valve 70g is provided in the air discharge channel 50, at a position near the dilution apparatus 20 (downstream of the first pressure reduction channel 68a).

The eighth open/close valve 70h is provided in the first pressure reduction channel 68a, at a position upstream of the first pressure reduction pump 66a, and the ninth open/close valve 70i is provided in the second pressure reduction channel 68b, at a position upstream of the second pressure reduction pump 66b. The tenth open/close valve 70j is provided in the dilution channel 48.

A first pressure sensor 72a is provided in the air supply channel 44, at a position between the second open/close valve 70b and the oxygen-containing gas supply passage 38a. A second pressure sensor 72b is provided in the hydrogen supply channel 54, at a position near the fuel gas supply passage 40a. The first pressure sensor 72a detects the pressure reduction state in the oxygen-containing gas flow field 34, and the second pressure sensor 72b detects the pressure reduction state in the fuel gas flow field 36.

For example, a load 74 such as a motor for driving a vehicle, or a motor for driving an air pump is provided for the fuel cell stack 12. The load 74 is electrically connectable to, and disconnectable from the fuel cell stack 12 through a switch 76.

Figure 2:
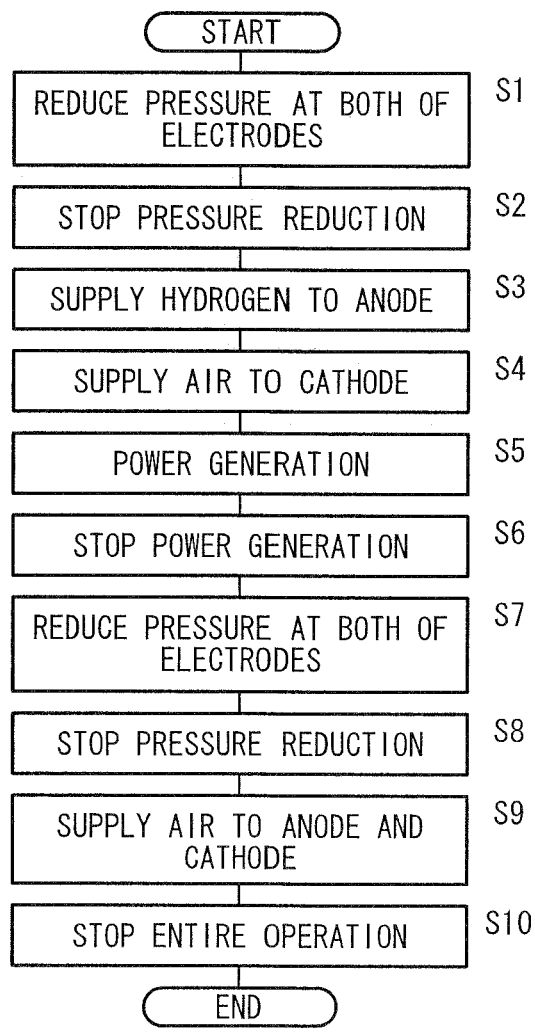
FIG. 2 is a flow chart showing a method of starting operation of the fuel cell system and a method of stopping operation of the fuel cell system according to the first embodiment of the present invention.

Operation of the fuel cell system 10 will be described with reference to a flow chart shown in FIG. 2 and a timing chart shown in FIG. 3 in relation to the method of starting operation of the fuel cell system 10, and the method of stopping operation of the fuel cell system 10 according to the first embodiment of the present invention.

In the fuel cell system 10, as described later, in the state where operation is stopped, the oxygen-containing gas flow field 34 and the fuel gas flow field 36 are filled with the oxygen-containing gas. Therefore, at the time of starting operation of the fuel cell system 10, firstly, a pressure reduction process of reducing the pressure in the oxygen-containing gas flow field 34 and the pressure in the fuel gas flow field 36 is carried out (step S1).

Figure 3:
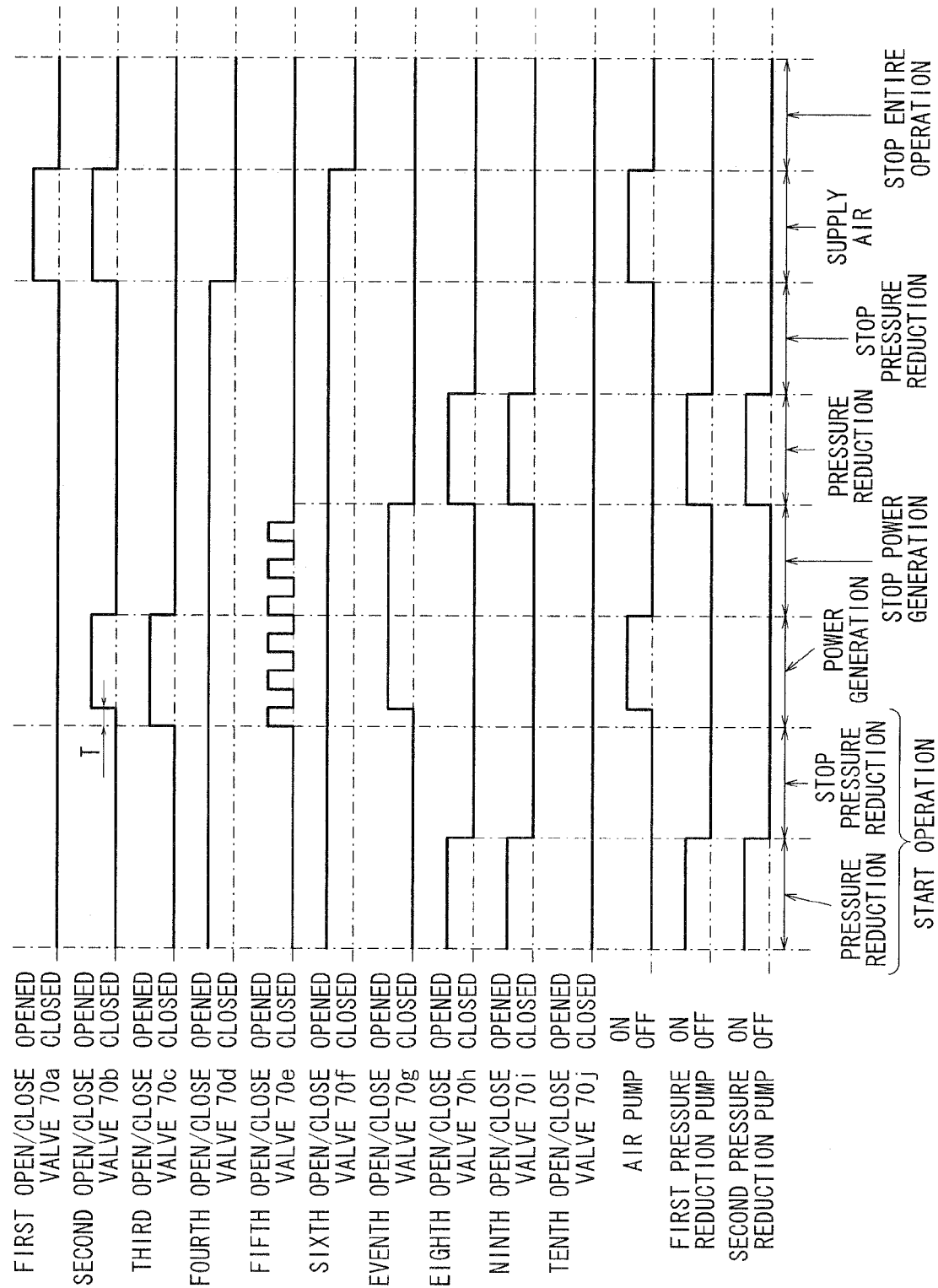
FIG. 3 is a timing chart in the first embodiment.
Figure 4:
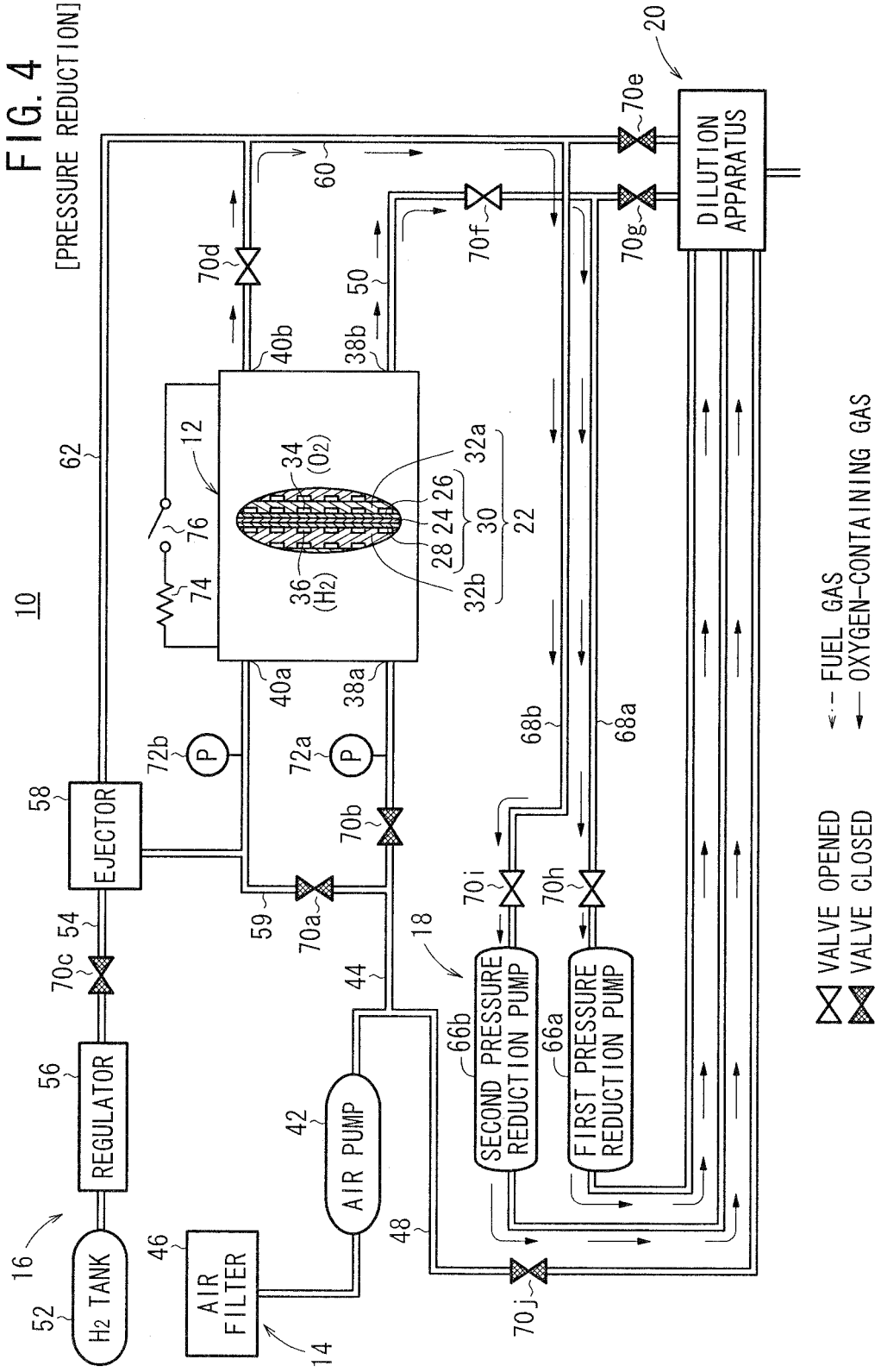
FIG. 4 is a diagram showing a state at the time of reducing the pressure in the fuel cell system.

Specifically, as shown in FIGS. 3 and 4, the first open/close valve 70a to the third open/close valve 70c, the fifth open/close valve 70e, the seventh open/close valve 70g, and the tenth open/close valve 70j are closed, and the fourth open/close valve 70d, the sixth open/close valve 70f, the eighth open/close valve 70h and the ninth open/close valve 70i are opened. In this state, the first pressure reduction pump 66a and the second pressure reduction pump 66b of the pressure reduction apparatus 18 are operated.

The first pressure reduction pump 66a is connected to the oxygen-containing gas flow field 34, and the gas in the oxygen-containing gas flow field 34 is suctioned by the first pressure reduction pump 66a. That is, since the oxygen-containing gas remaining in the oxygen-containing gas flow field 34 is suctioned by the first pressure reduction pump 66a, and discharged to the dilution apparatus 20, the pressure in the oxygen-containing gas flow field 34 is reduced. The pressure reduction state in the oxygen-containing gas flow field 34 is detected by the first pressure sensor 72a.

The second pressure reduction pump 66b suctions the oxygen-containing gas remaining in the fuel gas flow field 36, and the fuel gas is discharged to the dilution apparatus 20. Thus, the pressure in the fuel gas flow field 36 is reduced. The pressure reduction state in the fuel gas flow field 36 is detected by the second pressure sensor 72b.

Figure 5:
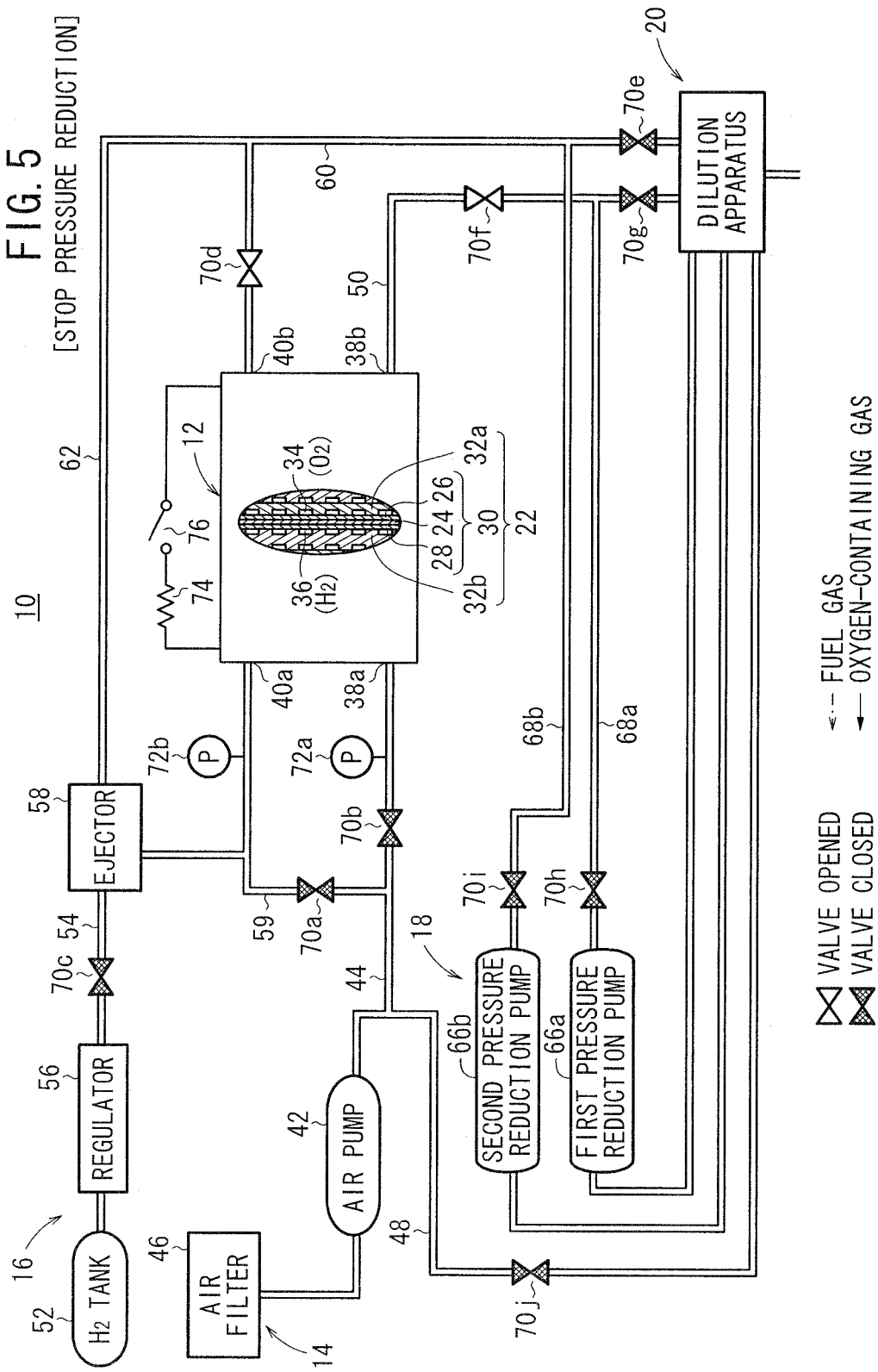
FIG. 5 is a diagram showing a state at the time of stopping pressure reduction in the fuel cell system.

After each of the oxygen-containing gas flow field 34 and the fuel gas flow field 36 reaches a predetermined pressure reduction state, pressure reduction is stopped (step S2), and this state is maintained for predetermined time. As shown in FIGS. 3 and 5, the state where the pressure reduction is stopped is maintained by closing the eighth open/close valve 70h and the ninth open/close valve 70i.

Then, the process proceeds to step S3 for supplying the fuel gas to each fuel gas flow field 36 of the fuel cell stack 12. After the elapse of predetermined time from supply of the fuel gas, supply of the oxygen-containing gas to each oxygen-containing gas flow field 34 is started (step S4).

Figure 6:
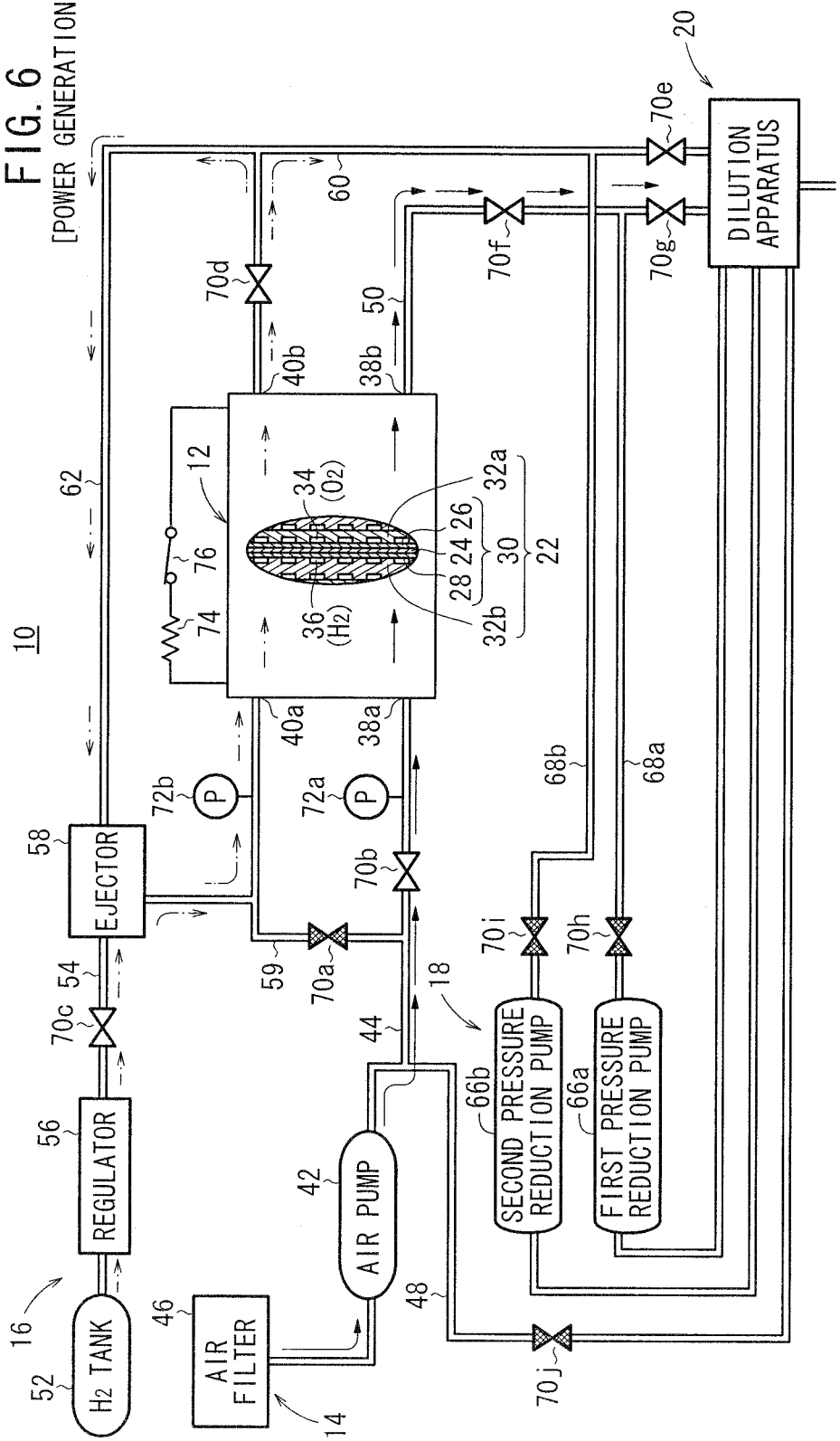
FIG. 6 is a diagram showing a state at the time of power generation in the fuel cell system.

Specifically, as shown in FIGS. 3 and 6, when time T has elapsed after the third open/close valve 70c has been opened, the second open/close valve 70b and the seventh open/close valve 70g are opened, and the fifth open/close valve 70e is opened intermittently (or opened partially to a predetermined degree).

Therefore, firstly, the fuel gas (hydrogen gas) is supplied from the hydrogen tank 52 to the hydrogen supply channel 54. After the pressure of the fuel gas is reduced by the regulator 56, the fuel gas is supplied to each fuel gas flow field 36 of the fuel cell stack 12. The fuel gas discharged from the fuel gas flow field 36 is suctioned to the ejector 58 through the hydrogen circulation channel 62, and the fuel gas is supplied again from the hydrogen supply channel 54 to the fuel gas flow field 36.

Thereafter, the air pump 42 is operated to supply the air (oxygen-containing gas) from the air supply channel 44 to each oxygen-containing gas flow field 34 of the fuel cell stack 12. The air discharged from the oxygen-containing gas flow field 34 is supplied to the dilution apparatus 20.

Then, the switch 76 is closed to electrically connect the load 74 to the fuel cell stack 12. Thus, power generation by the fuel cell stack 12 is started (step S5).

At the time of power generation, the oxygen-containing gas flows into the oxygen-containing gas flow field 34 of each fuel cell 22, and is supplied to the cathode 26. The fuel gas flows into each fuel gas flow field 36, and is supplied to the anode 28. Thus, the air supplied to the cathode 26 and the fuel gas supplied to the anode 28 are consumed in electrochemical reactions at the anode 28 and the cathode 26 for generating electricity.

Figure 7:
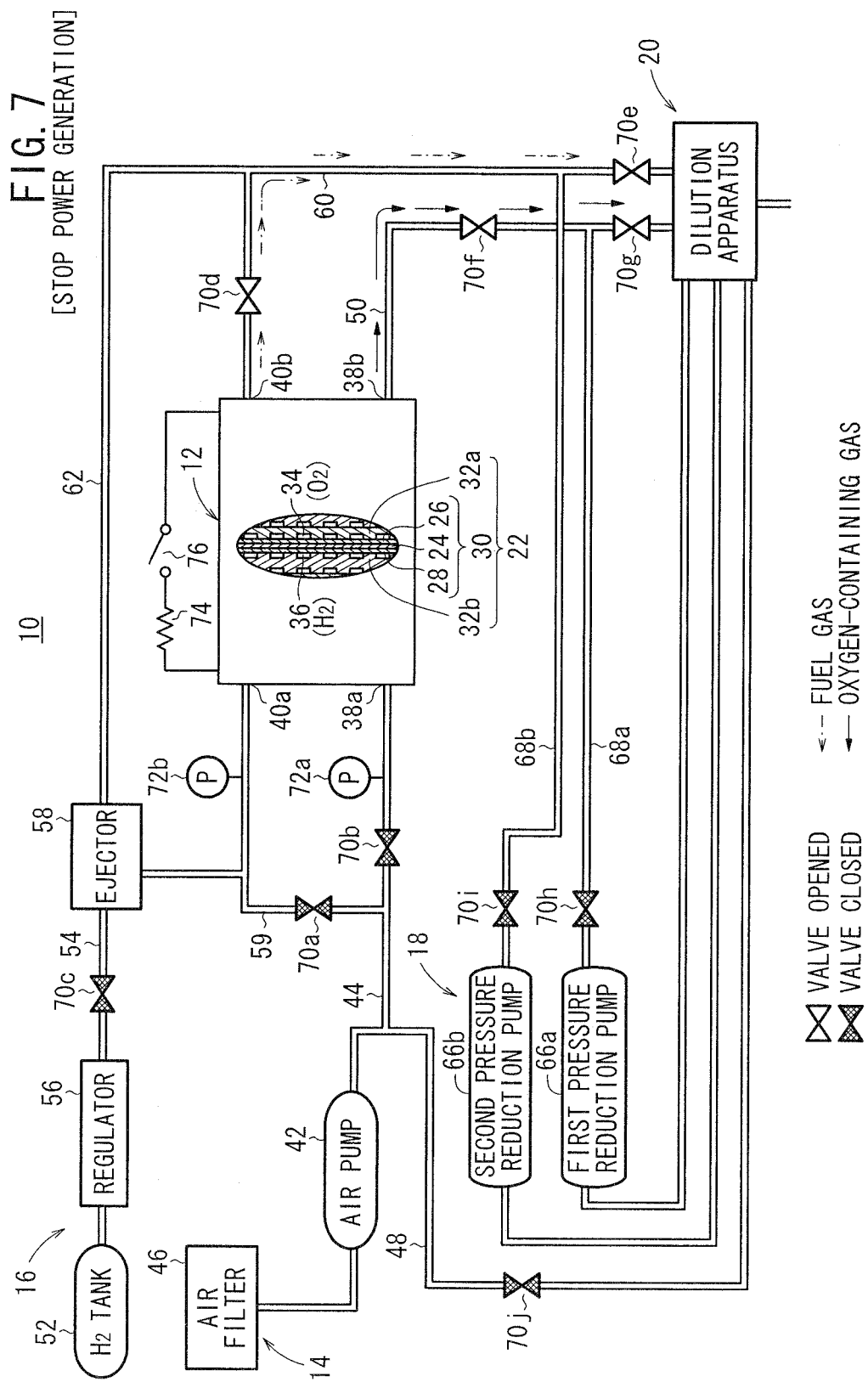
FIG. 7 is a diagram showing a state at the time of stopping power generation in the fuel cell system.

At the time of stopping power generation by the fuel cell stack 12 (step S6), the switch 76 is opened to electrically disconnect the fuel cell stack 12 from the load 74. Therefore, the power supply from the fuel cell stack 12 to the outside is stopped. In the meanwhile, as shown in FIGS. 3 and 7, the second open/close valve 70b and the third open/close valve 70c are closed, and supply of the air and the fuel gas to the fuel cell stack 12 is stopped.

Figure 8:
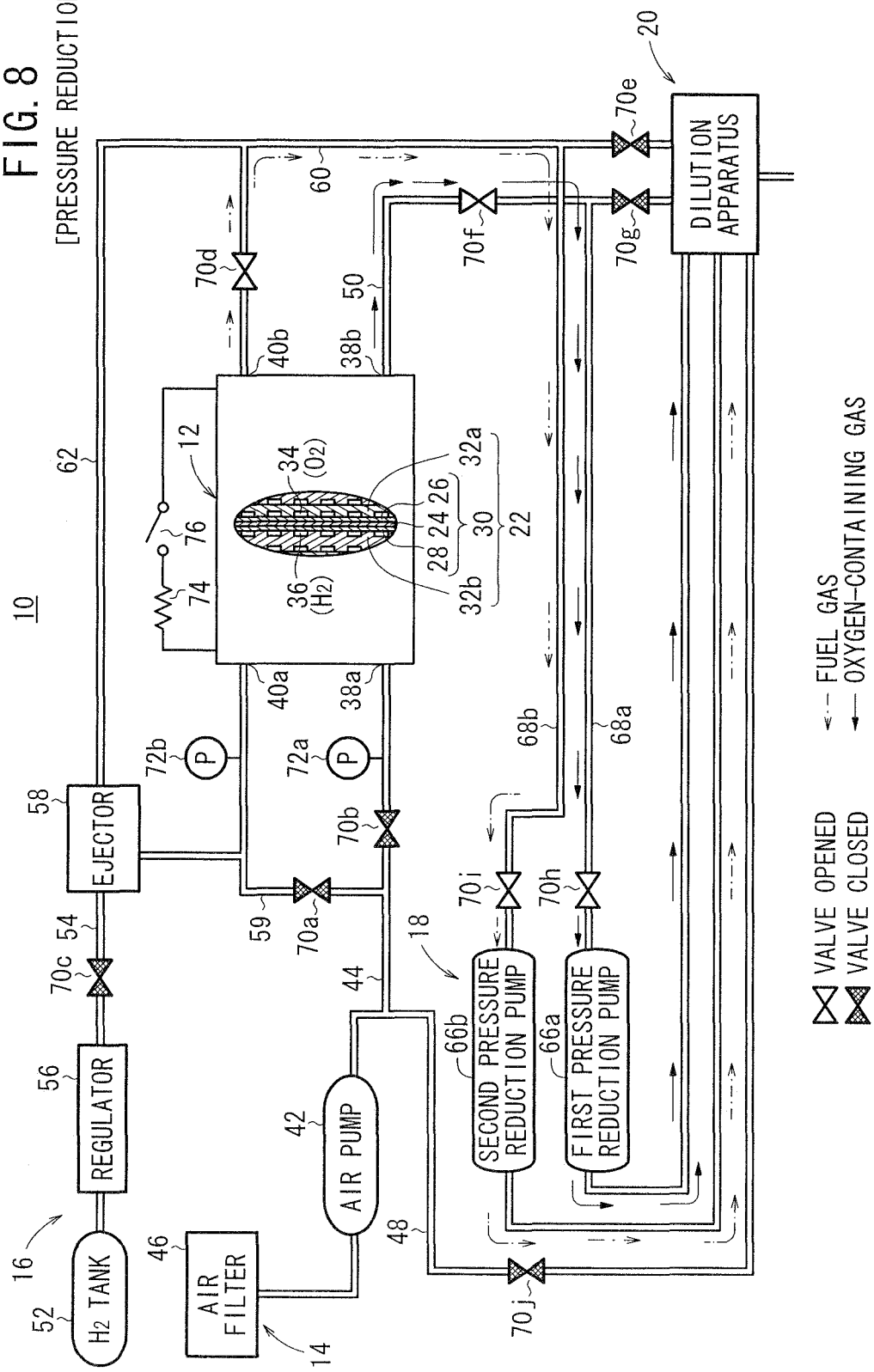
FIG. 8 is a diagram showing a state at the time of reducing the pressure in the fuel cell system.

Then, the process proceeds to step S7 for reducing the pressure in the oxygen-containing gas flow field 34 and the pressure in the fuel gas flow field 36. During the pressure reduction process, as shown in FIGS. 3 and 8, the fifth open/close valve 70e and the seventh open/close valve 70g are closed, and the eighth open/close valve 70h and the ninth open/close valve 70i are opened.

Thus, by operation of the first pressure reduction pump 66a, the gas in the oxygen-containing gas flow field 34 is suctioned. That is, the oxygen-containing gas remaining in the oxygen-containing gas flow field 34 is discharged to the dilution apparatus 20, and the pressure in the oxygen-containing gas flow field 34 is reduced. Further, by operation of the second pressure reduction pump 66b, the gas in the fuel gas flow field 36 is suctioned. That is, the fuel gas remaining in the fuel gas flow field 36 is discharged to the dilution apparatus 20, and the pressure in the fuel gas flow field 36 is reduced.

At this time, the air remaining in the oxygen-containing gas flow field 34 flows into the dilution apparatus 20. Therefore, the fuel gas discharged from the fuel gas flow field 36 is diluted suitably. It should be noted that the tenth open/close valve 70j may be opened, and the air pump 42 may be operated to supply the air for dilution to the dilution apparatus 20.

After the oxygen-containing gas flow field 34 and the fuel gas flow field 36 reach the predetermined pressure reduction states, the pressure reduction process is stopped (step S8). In step S8, as shown in FIGS. 3 and 5, the eighth open/close valve 70h and the ninth open/close valve 70i are closed. Thus, the predetermined pressure reduction states in the oxygen-containing gas flow field 34 and the fuel gas flow field 36 are maintained. After the elapse of predetermined time, the air is supplied to the fuel cell stack 12.

Figure 9:
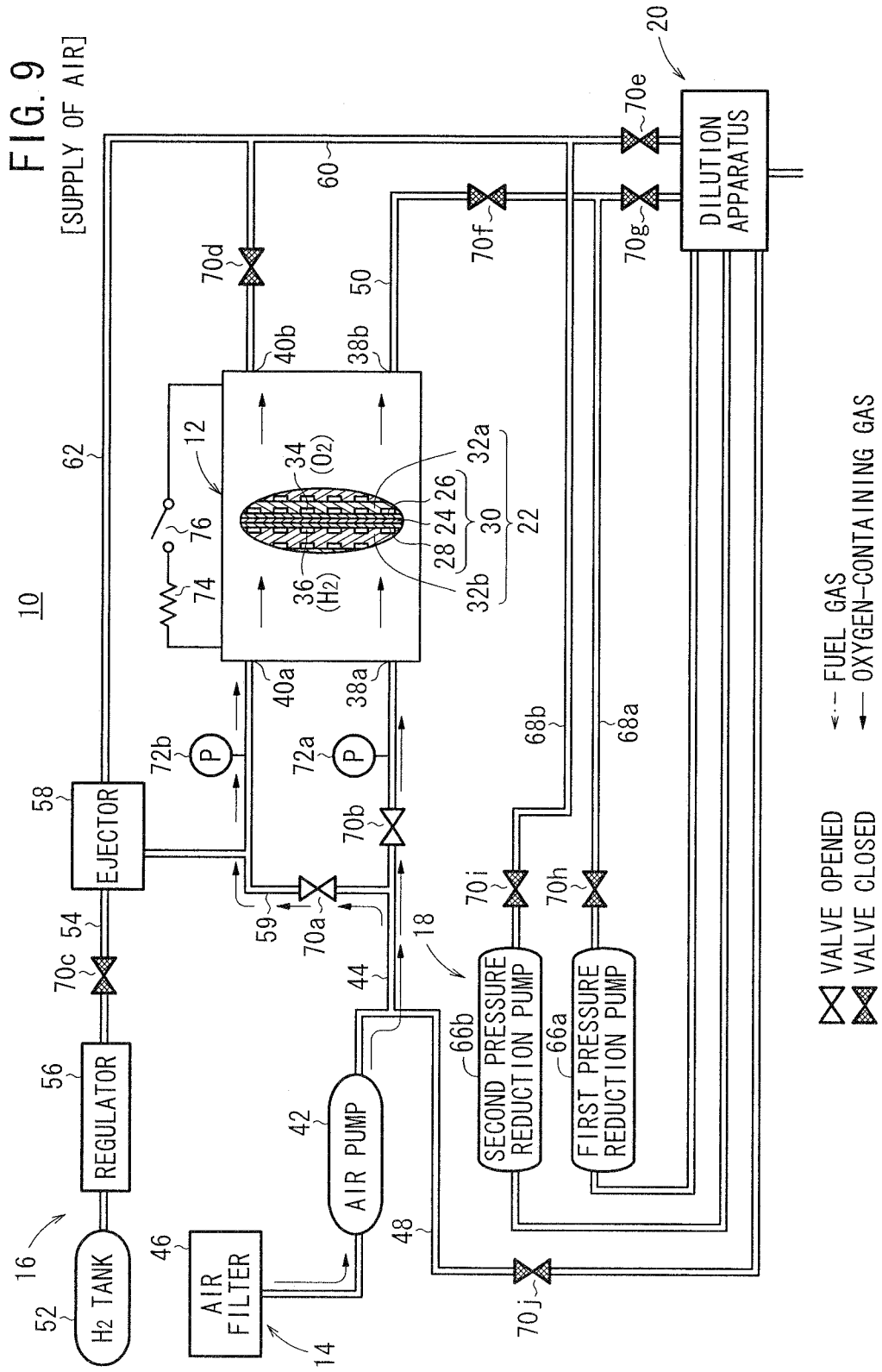
FIG. 9 is a diagram showing a state at the time of supplying the air into the fuel cell system.

Specifically, as shown in FIGS. 3 and 9, the fourth open/close valve 70d and the sixth open/close valve 70f are closed, the first open/close valve 70a and the second open/close valve 70b are opened, and the air pump 42 is operated. Therefore, by the air pump 42, the air is supplied to the air supply channel 44. The air is supplied to each oxygen-containing gas flow field 34 of the fuel cell stack 12. Further, the air is supplied to the hydrogen supply channel 54 through the branch channel 59, and supplied to each fuel gas flow field 36 of the fuel cell stack 12 (step S9).

Then, after the pressure of the oxygen-containing gas filled in the fuel gas flow field 36 and the oxygen-containing gas flow field 34 reaches the atmospheric pressure, the first to third open/close valves 70a to 70c are closed, and the operation of the entire fuel cell system 10 is stopped (fully stopped) (step S10).

In the first embodiment, at the time of stopping operation of the fuel cell system 10, as shown in FIG. 8, the pressure in the oxygen-containing gas flow field 34 is reduced by the first pressure reduction pump 66a of the pressure reduction apparatus 18, and the pressure in the fuel gas flow field 36 is reduced by the second pressure reduction pump 66b. Then, as shown in FIG. 9, the air is supplied from the air pump 42 to the oxygen-containing gas flow field 34 and the fuel gas flow field 36.

At this time, the pressure reduction states of the fuel gas flow field 36 and the oxygen-containing gas flow field 34 are maintained, and the oxygen-containing gas is forcibly suctioned into the fuel gas flow field 36 and the oxygen-containing gas flow field 34. Therefore, the fuel gas flow field 36 and the oxygen-containing gas flow field 34 are rapidly filled with the oxygen-containing gas. Therefore, the process of stopping operation of the fuel cell system 10 is carried out rapidly and reliably.

Further, in the first embodiment, in a state where the oxygen-containing gas flow field 34 and the fuel gas flow field 36 are filled with the oxygen-containing gas, at the time of starting operation of the fuel cell system 10, firstly, the pressure in the oxygen-containing gas flow field 34 and the pressure in the fuel gas flow field 36 are reduced (see FIG. 4). Therefore, it is possible to rapidly and reliably supply the fuel gas to the fuel gas flow field 36, and rapidly and reliably supply the air to the oxygen-containing gas flow field 34. Thus, operation of the fuel cell stack 12 is started efficiently.

Further, after the pressure reduction process is carried out, firstly, the fuel gas is supplied to the fuel gas flow field 36 for predetermined time T, and then, the air is supplied to the oxygen-containing gas flow field 34. In this manner, it is possible to prevent the cathode 26 from having a high potential, and prevent degradation in the performance of the electrode catalyst layer.

Figure 10:
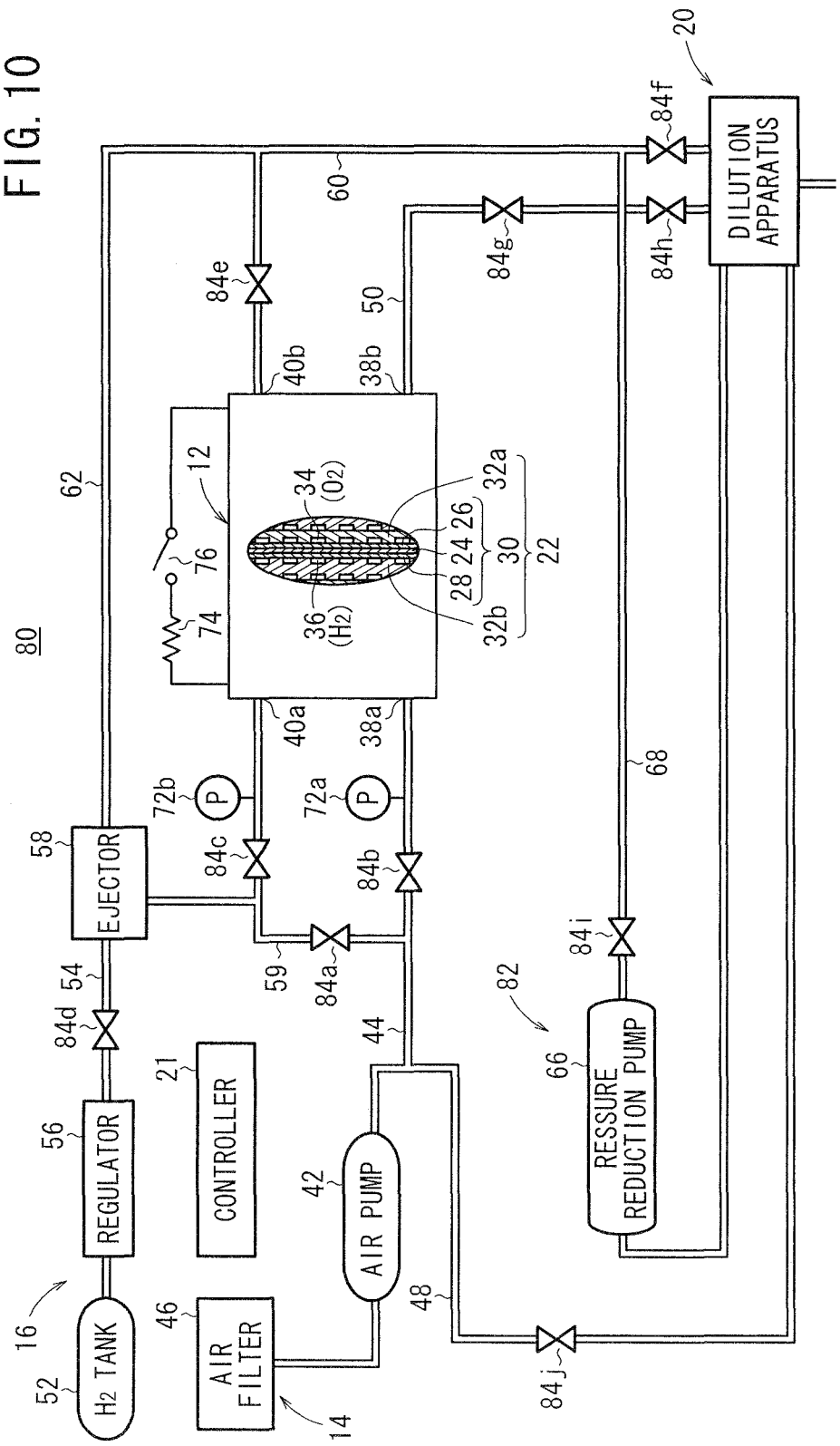
FIG. 10 is a diagram schematically showing structure of a fuel cell system according to a second embodiment of the present invention.

FIG. 10 is a diagram schematically showing structure of a fuel cell system 80 according to a second embodiment of the preset invention. The constituent elements that are identical to those of the fuel cell system 10 according to the first embodiment are labeled with the same reference numeral, and descriptions thereof will be omitted.

The fuel cell system 80 includes a pressure reduction apparatus 82, and the pressure reduction apparatus 82 includes a pressure reduction pump 66 for suctioning the gas in the fuel gas flow field 36. The pressure reduction pump 66 is provided in the pressure reduction channel 68, and the pressure reduction channel 68 is connected to the off gas channel 60 and the dilution apparatus 20.

The fuel cell system 80 includes first to tenth open/close valves 84a to 84j. The first open/close valve 84a is provided in a branch channel 59, and the second open/close valve 84b is provided in the air supply channel 44. The third open/close valve 84c is provided in the hydrogen supply channel 54, at a position near the fuel gas supply passage 40a, and the fourth open/close valve 84d is provided in the hydrogen supply channel 54, at a position between the regulator 56 and the ejector 58.

The fifth open/close valve 84e is provided in the off gas channel 60, at a position near the fuel gas discharge passage 40b, and the sixth open/close valve 84f is provided in the off gas channel 60, at a position near the dilution apparatus 20. The seventh open/close valve 84g is provided in the air discharge channel 50, at a position near the oxygen-containing gas discharge passage 38b. The eighth open/close valve 84h is provided in the air discharge channel 50, at a position near the dilution apparatus 20. The ninth open/close valve 84i is provided in the pressure reduction channel 68, and the tenth open/close valve 84j is provided in the dilution channel 48.

Figure 11:
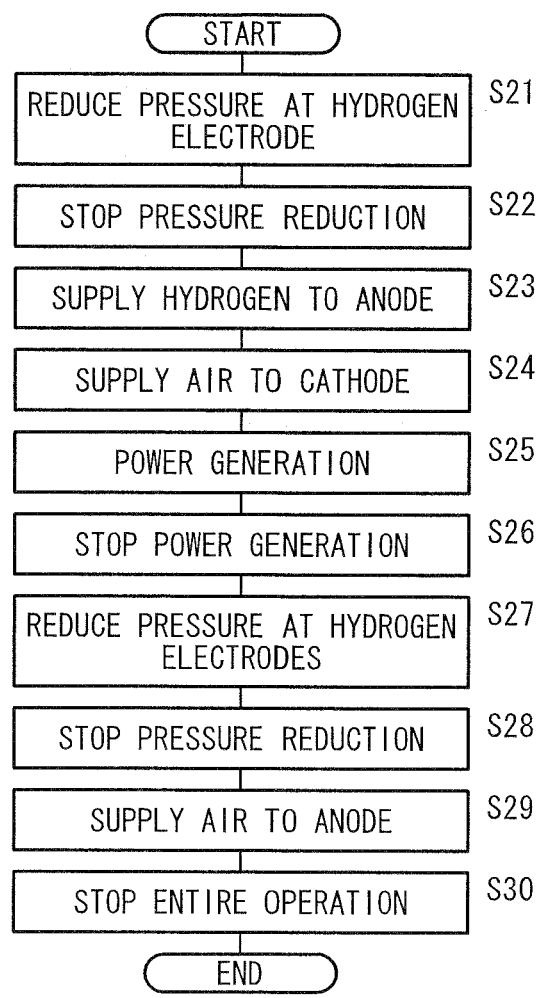
FIG. 11 is a flow chart showing a method of staring operation of the fuel cell system and a method of stopping operation of the fuel cell system according to the second embodiment of the present invention.

Operation of the fuel cell system 80 will be described with reference to a flow chart shown in FIG. 11 and a timing chart shown in FIG. 12.

As in the case of the fuel cell system 10, operation of the fuel cell system 80 is stopped in the state where the oxygen-containing gas flow field 34 and the fuel gas flow field 36 are filled with the oxygen-containing gas. Therefore, at the time of starting operation, firstly, the pressure in the fuel gas flow field 36 is reduced (step S21).

Figure 12:
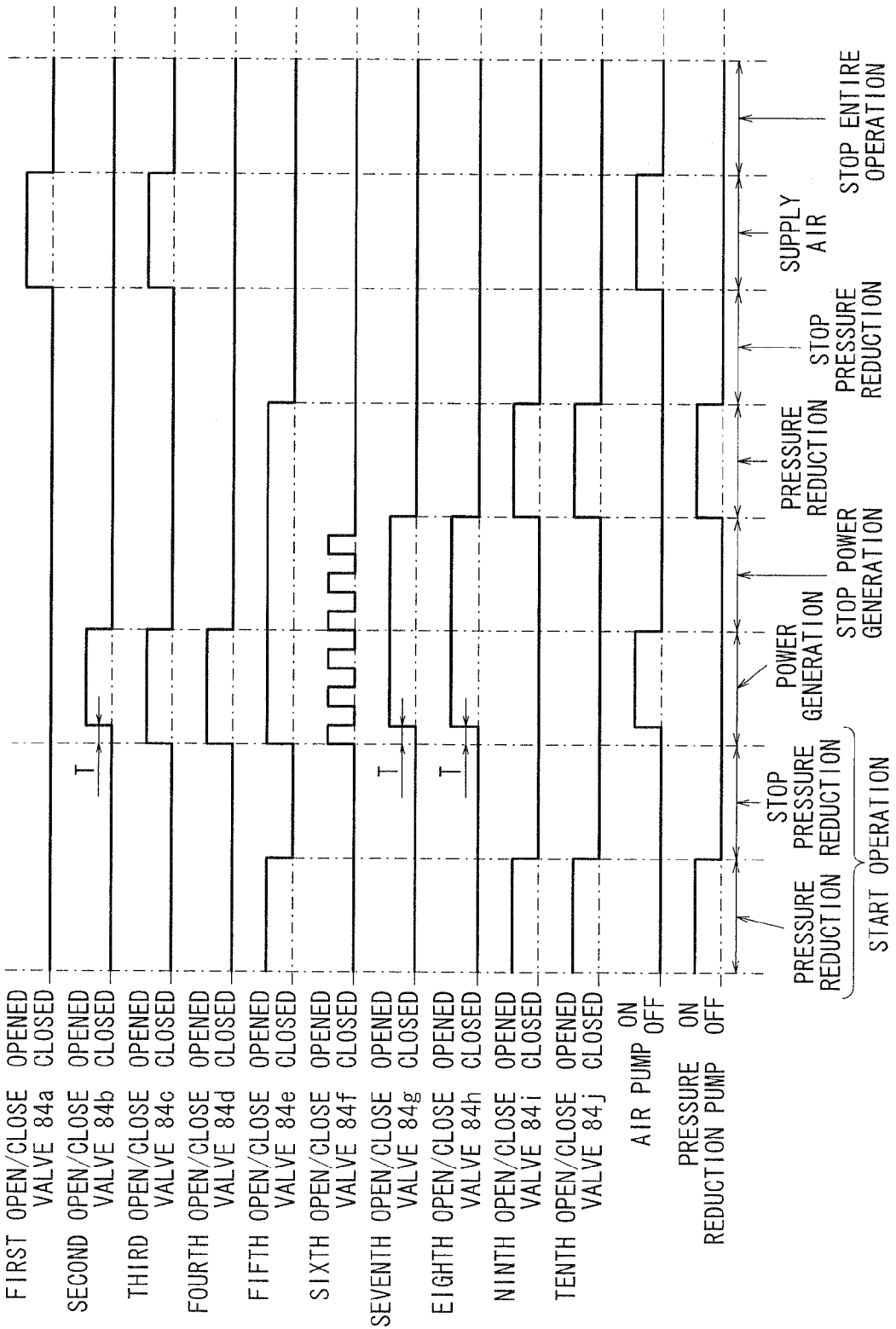
FIG. 12 is a timing chart in the second embodiment.
Figure 13:
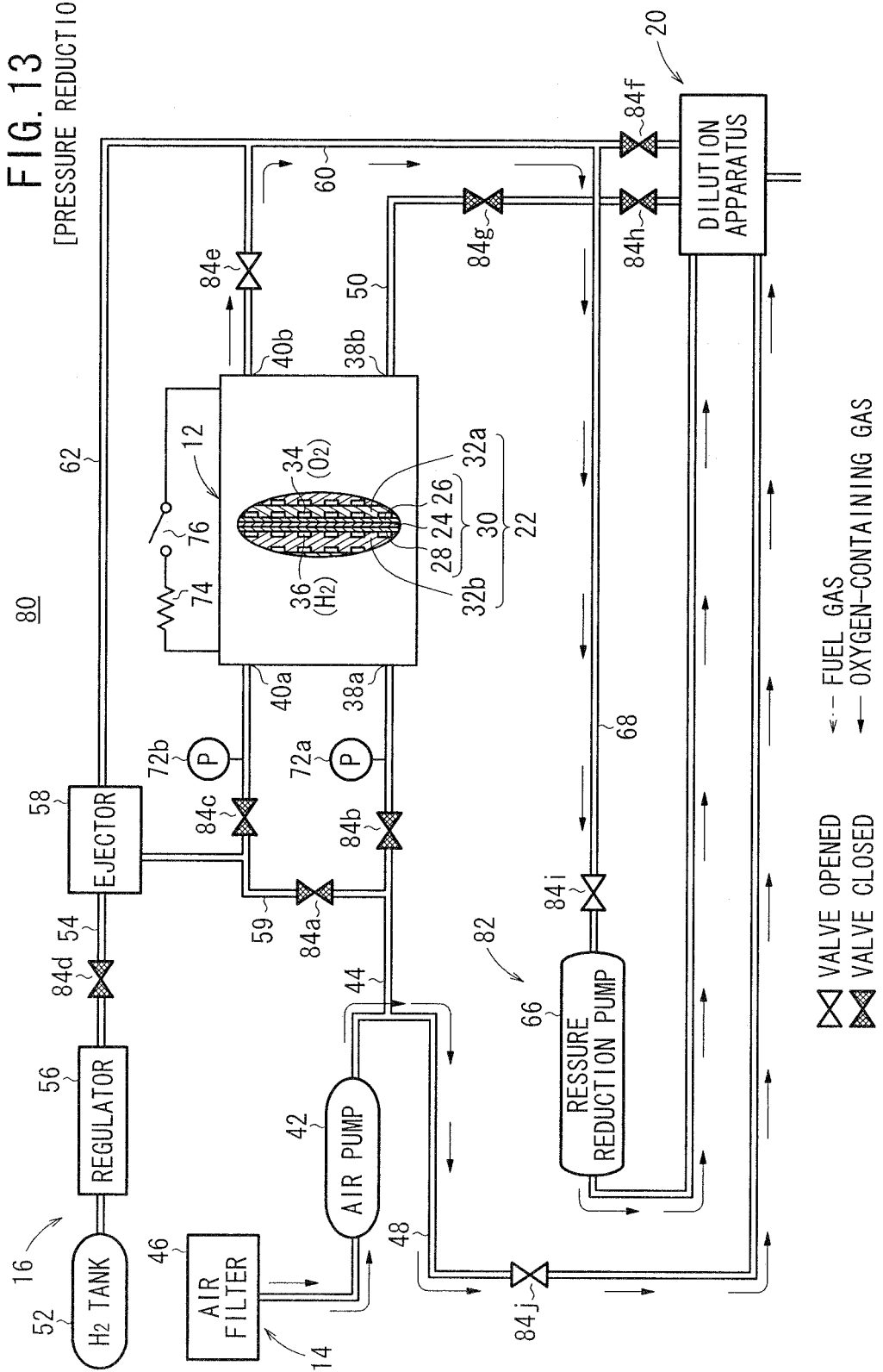
FIG. 13 is a diagram showing a state at the time of reducing the pressure in the fuel cell system.

As shown in FIGS. 12 and 13, the first to fourth open/close valves 84a to 84d and sixth to eighth open/close valves 84f to 84h are closed, and the fifth open/close valve 84e, the ninth open/close valve 84i and the tenth open/close valve 84j are opened. In this state, the pressure reduction pump 66 is operated.

Figure 14:
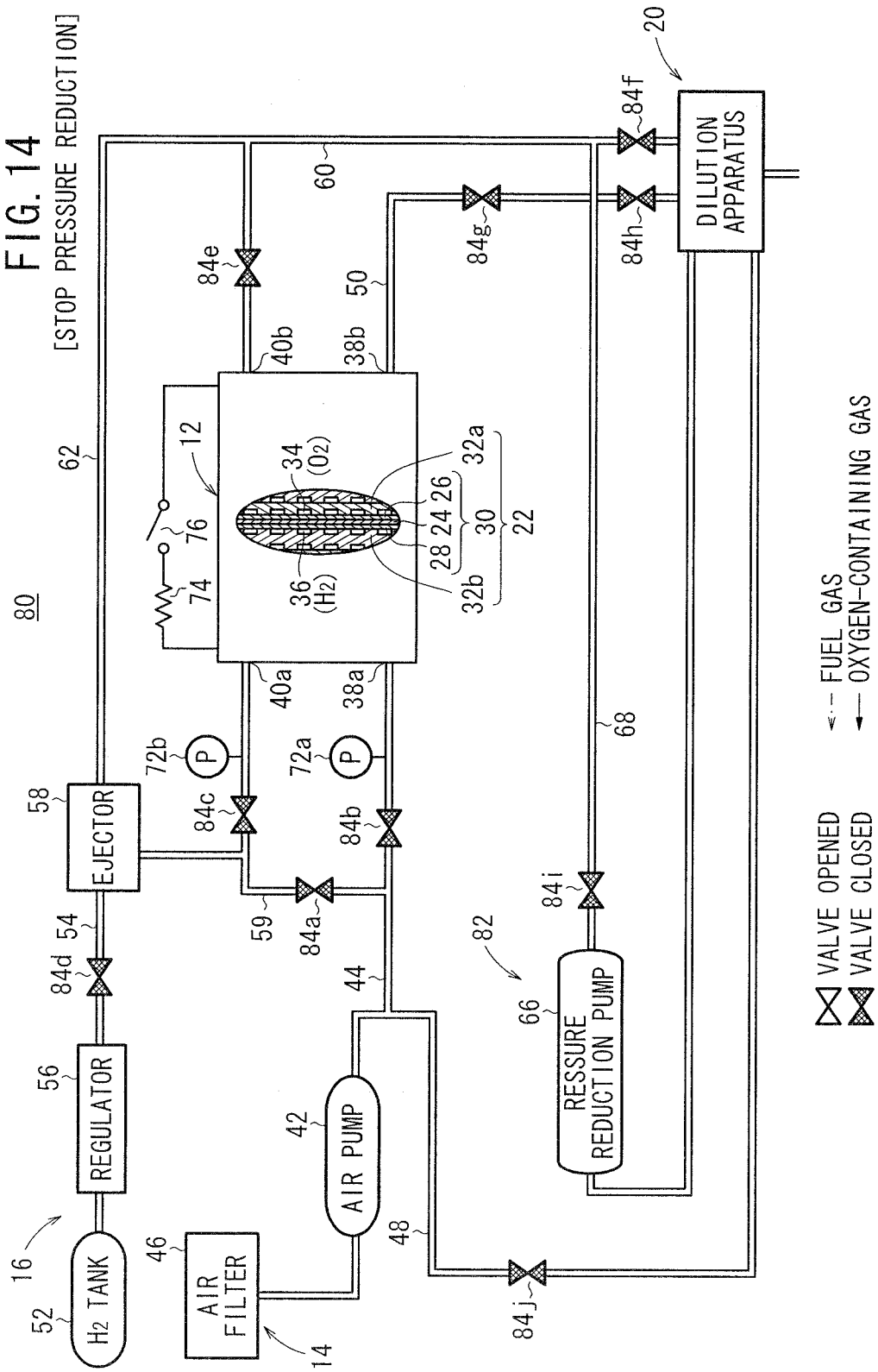
FIG. 14 is a diagram showing a state at the time of stopping pressure reduction in the fuel cell system.

Thus, the gas in the fuel gas flow field 36 is suctioned, and the oxygen-containing gas remaining in the fuel gas flow field 36 is discharged to the dilution apparatus 20 by suction operation of the pressure reduction pump 66. Then, after the pressure reduction is stopped (step S22), this state is maintained for predetermined time. In the state where the pressure reduction is stopped, as shown in FIGS. 12 and 14, the fifth open/close valve 84e, the ninth open/close valve 84i, and the tenth open/close valve 84j are closed. Thus, the inlet and the outlet of the fuel gas flow field 36 are closed.

Figure 15:
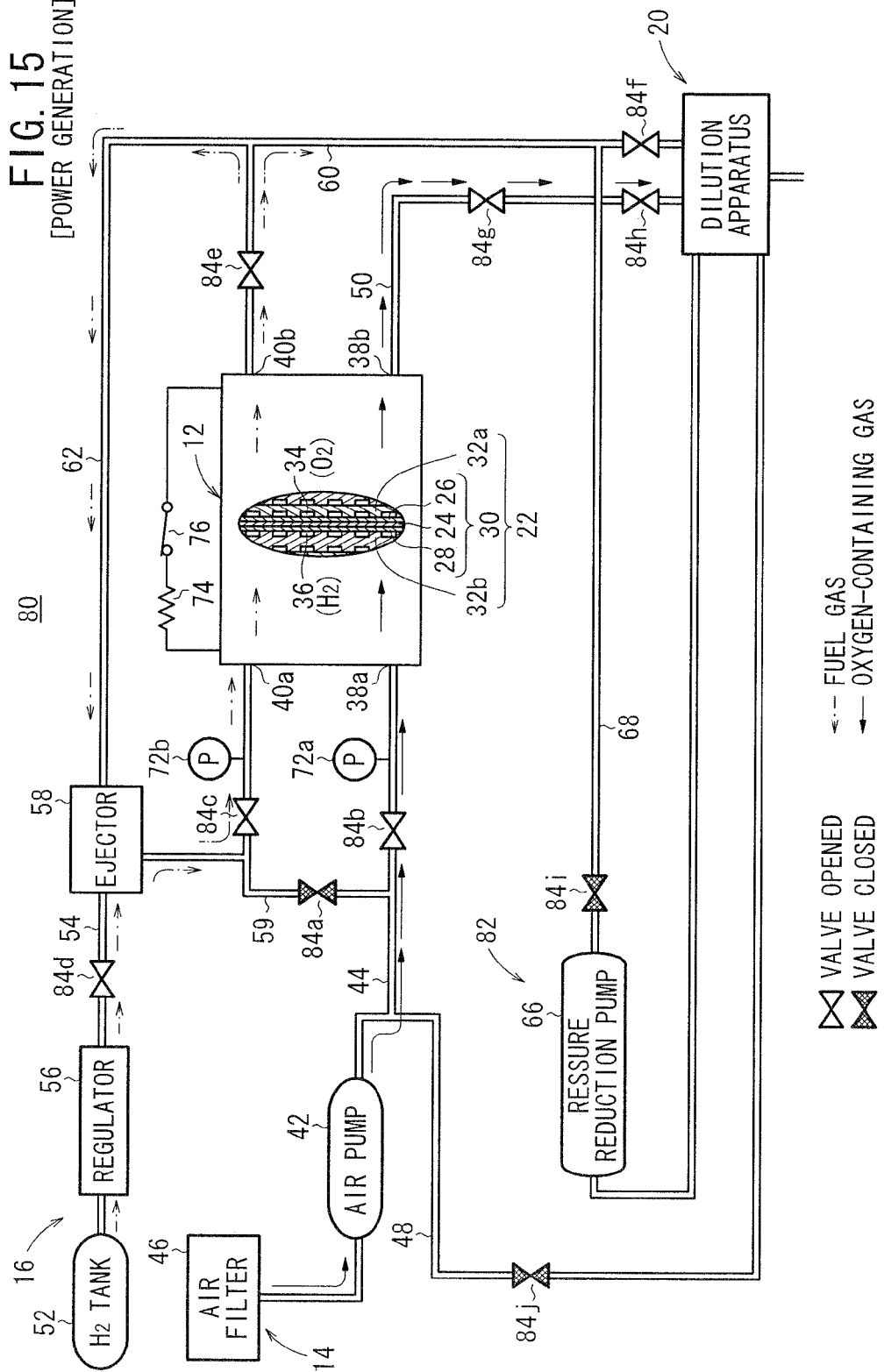
FIG. 15 is a diagram showing a state at the time of power generation in the fuel cell system.

Then, the process proceeds to step S23 to start supply of the fuel gas to the fuel gas flow field 36. As shown in FIGS. 12 and 15, firstly, the third open/close valve 84c to the fifth open/close valve 84e are opened, and the sixth open/close valve 84f is opened/closed intermittently (or partially opened to a predetermined degree). Therefore, the fuel gas is supplied from the hydrogen tank 52 to each fuel gas flow field 36 of the fuel cell stack 12 through the hydrogen supply channel 54. The fuel gas discharged from the fuel gas flow field 36 flows through the hydrogen circulation channel 62, and then, the fuel gas is supplied again to the fuel gas flow field 36.

After elapse of predetermined time T, the second open/close valve 84b, the seventh open/close valve 84g, and the eighth open/close valve 84h are opened. Therefore, by operation of the air pump 42, the air is supplied to each oxygen-containing gas flow field 34 of the fuel cell stack 12 (step S24). The air from the oxygen-containing gas flow field 34 is discharged to the dilution apparatus 20. In this state, the switch 76 is closed to electrically connect the load 74 to the fuel cell stack 12. Thus, power generation by the fuel cell stack 12 is started (step S25).

Figure 16:
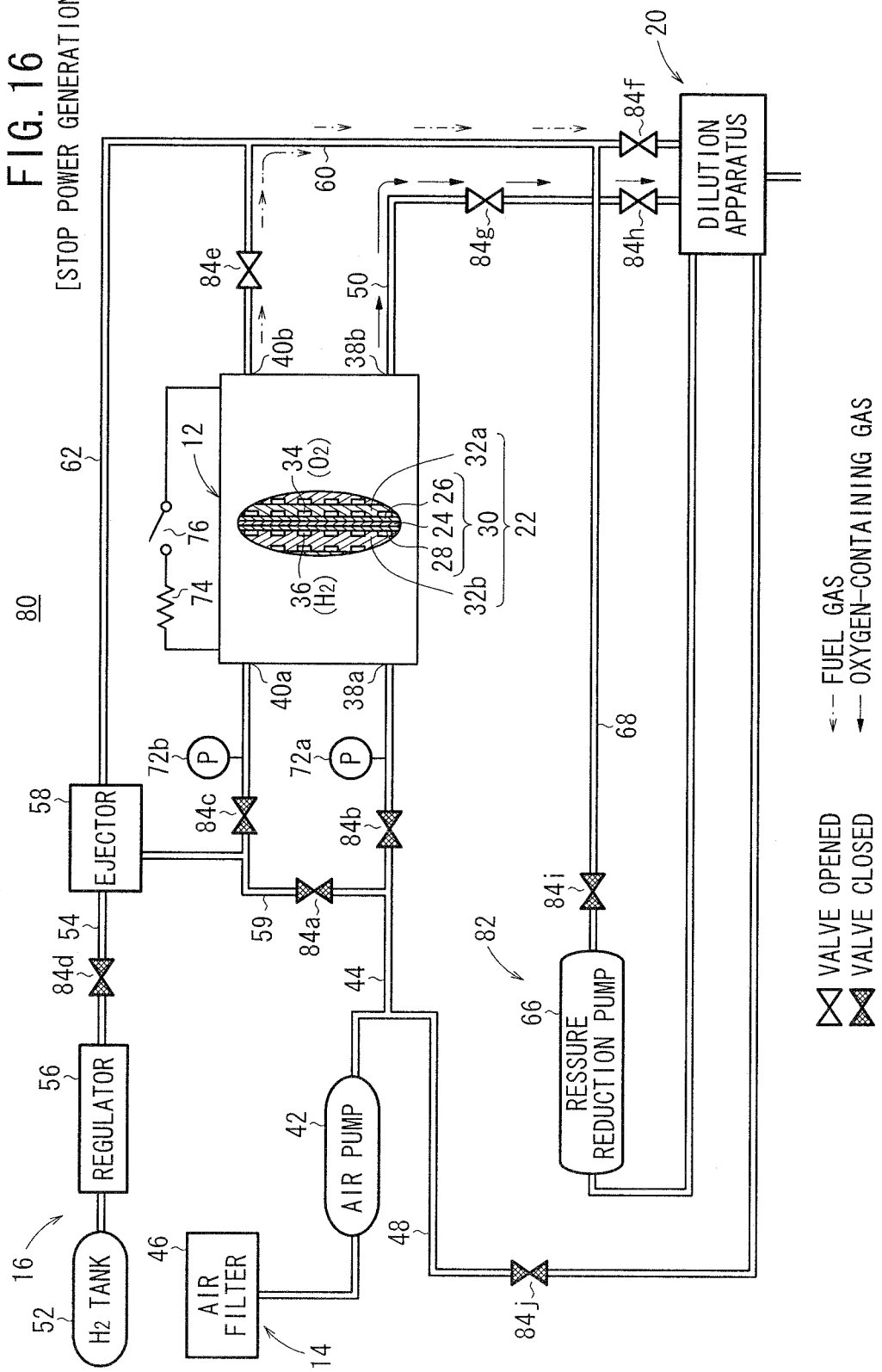
FIG. 16 is a diagram showing a state at the time of stopping power generation in the fuel cell system.
Figure 17:
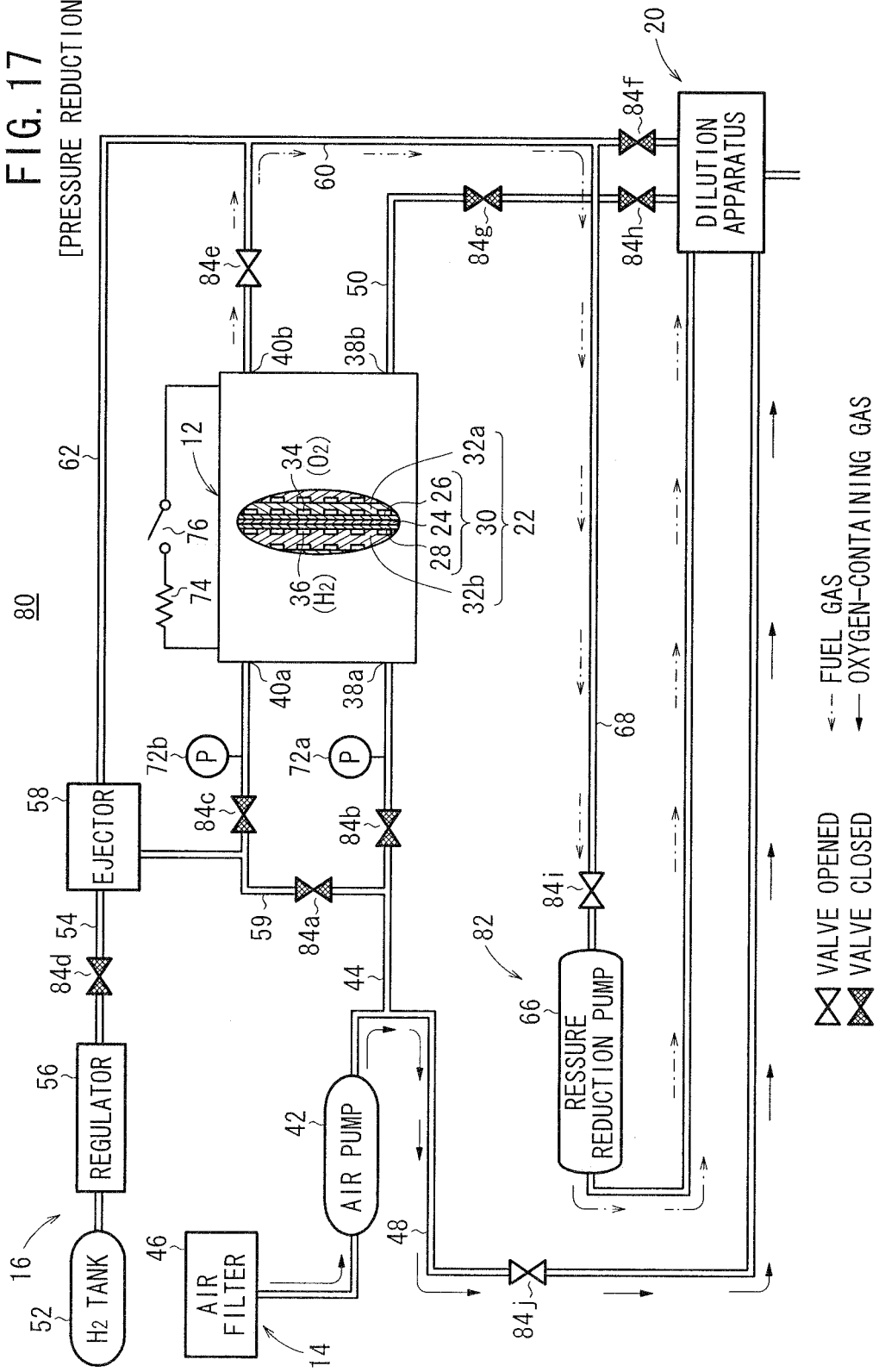
FIG. 17 is a diagram showing a state of reducing the pressure in the fuel cell system.

Further, as shown in FIGS. 12 and 16, after power generation of the fuel cell system 10 is stopped (step S26), the process proceeds to step S27, and the pressure reduction in the fuel gas flow field 36 is started. As shown in FIGS. 12 and 17, the sixth to eighth open/close valves 84f to 84h are closed, and the ninth and tenth open/close valves 84i and 84j are opened. Then, the air pump 42 and the pressure reduction pump 66 are operated at the same time.

Thus, by operation of the pressure reduction pump 66, the fuel gas flow field 36 is suctioned. That is, the fuel gas remaining in the fuel gas flow field 36 is discharged to the dilution apparatus 20, and the pressure in the fuel gas flow field 36 is reduced. In the meanwhile, by operation of the air pump 42, the air for dilution is supplied from the dilution channel 48 to the dilution apparatus 20. Thus, in the dilution apparatus 20, the fuel gas is diluted suitably with the air. The diluted fuel gas can be discharged from the dilution apparatus 20 to the outside.

When the fuel gas flow field 36 reaches a predetermined pressure reduction state, as shown in FIGS. 12 and 14, pressure reduction is stopped (step S28). Then, after the pressure reduction state is maintained for predetermined time, supply of the air to the fuel gas flow field 36 is started (step S29).

Figure 18:
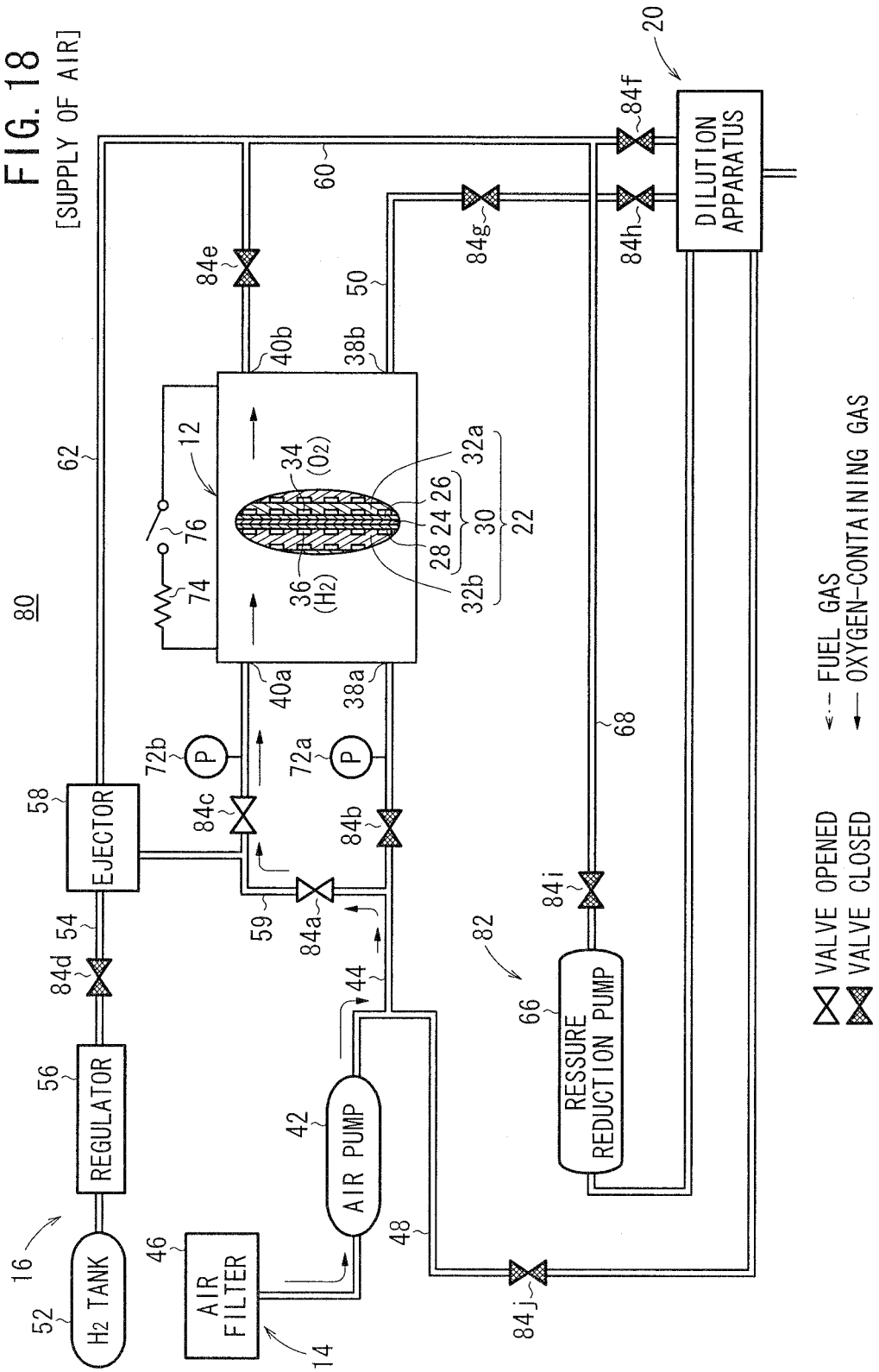
FIG. 18 is a diagram showing a state at the time of supplying the air into the fuel cell system.

Specifically, as shown in FIGS. 12 and 18, the seventh open/close valve 84g is closed, and the first open/close valve 84a and the third open/close valve 84c are opened. Thus, when the air pump 42 is operated, the air is supplied to the air supply channel 44. The air is supplied to the hydrogen supply channel 54 through the branch channel 59, and supplied to each fuel gas flow field 36 of the fuel cell stack 12.

Then, after the air pressure in the fuel gas flow field 36 reaches the atmospheric pressure, operation of the entire fuel cell system 80 is stopped (step S30). In this state, all of the first to tenth open/close valves 84a to 84j are closed.

In the second embodiment, at the time of stopping operation of the fuel cell system 80, after the pressure in the fuel gas flow field 36 is reduced, the air is supplied to the fuel gas flow field 36. Therefore, the process of filling the fuel gas flow field 36 with the air is performed reliably in a short period of time. Thus, the same advantages as in the case of the first embodiment are obtained. That is, for example, the process of stopping operation of the fuel cell system 80 is carried out rapidly and reliably.

Further, in the second embodiment, at the time of starting operation of the fuel cell system 80, firstly, the pressure in the fuel gas flow field 36 is reduced, and the air remaining in the fuel gas flow field 36 is suctioned, and then, the fuel gas flows into the fuel gas flow field 36. Therefore, since the fuel gas flow field 36 is filled with the fuel gas in the pressure reduction state, the fuel gas is supplied rapidly and reliably. Thus, the same advantages as in the case of the first embodiment are obtained. That is, for example, operation of the fuel cell system 80 is started efficiently.

While the invention has been particularly shown and described with reference to preferred embodiments, it will be understood that variations and modifications can be effected thereto by those skilled in the art without departing from the spirit of the invention as defined by the appended claims.

What is claimed is:

1. A method of stopping operation of a fuel cell system including a fuel cell having an oxygen-containing gas flow field for supplying an oxygen-containing gas to a cathode and a fuel gas flow field for supplying a fuel gas to an anode to generate electricity by electrochemical reactions of the oxygen-containing gas and the fuel gas, the method comprising:
   stopping supply of electricity from the fuel cell to the outside;
   stopping supply of the oxygen-containing gas to the oxygen-containing gas flow field and stopping supply of the fuel gas to the fuel gas flow field;
   suctioning, using a pump, a gas at least from the fuel gas flow field to reduce the pressure in the fuel gas flow field; and
   after the suctioning of the gas from the fuel gas flow field, supplying the oxygen-containing gas at least to the fuel gas flow field for filling the fuel gas flow field and the oxygen-containing gas flow field with the oxygen-containing gas, wherein the oxygen-containing gas supplied to the fuel gas flow field is fed from an air pump which is used to supply the oxygen containing gas to the fuel cell to generate electricity.

* * * * *